(12) United States Patent
Gupta et al.

(10) Patent No.: US 8,938,248 B2
(45) Date of Patent: *Jan. 20, 2015

(54) ENHANCED MANAGEABILITY IN WIRELESS DATA COMMUNICATION SYSTEMS

(71) Applicant: Jasper Technologies, Inc., Mountain View, CA (US)

(72) Inventors: Amit Gupta, Livermore, CA (US); Carl Keller, Danville, CA (US); Jahangir Mohammed, Santa Clara, CA (US); Suparna Kumar, San Jose, CA (US)

(73) Assignee: Jasper Technologies, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,124

(22) Filed: Feb. 3, 2014

(65) Prior Publication Data

US 2014/0155034 A1    Jun. 5, 2014

Related U.S. Application Data

(63) Continuation of application No. 13/437,775, filed on Apr. 2, 2012, now Pat. No. 8,644,840, which is a (Continued)

(51) Int. Cl.
*H04W 74/00* (2009.01)
*H04W 12/06* (2009.01)

(Continued)

(52) U.S. Cl.
CPC ............. *H04W 12/06* (2013.01); *H04B 7/26* (2013.01); *H04L 63/0853* (2013.01)
USPC ..................... 455/452.1; 455/432.3; 455/433; 455/435.1; 709/219; 709/228; 713/182; 713/183; 713/186

(58) Field of Classification Search
CPC ....... H04W 12/06; H04W 4/001; H04W 4/12; H04W 4/206; H04W 76/021; H04W 36/32; H04W 48/02; H04W 4/046; H04W 84/005; H04W 4/02; H04W 4/24; H04W 4/14; H04W 4/22; H04W 88/02; H04W 12/04
USPC ......... 455/432.3, 433, 435.1, 452.1; 709/219, 709/226, 228.229; 713/182–186, 159

See application file for complete search history.

(56) References Cited

U.S. PATENT DOCUMENTS 5,377,269 A * 12/1994 Heptig et al. ..................... 726/20
6,741,853 B1 * 5/2004 Jiang et al. ..................... 455/418

(Continued)

FOREIGN PATENT DOCUMENTS

WO    96/36197 A1    11/1996
WO    98/12891 A1    3/1998

OTHER PUBLICATIONS

3rd Generation Partnership Project: Technical Specification Group Services and System Aspects: General Packet Radio Service (GPRS); Service description; Stage 2 (Release 7); 3GPP Standard; 3GPPTS 23.060, 3rd Generation Partnership Project (#GPP), Mobile Competence Centre; 650, Route Des Lucioles; F-06921 Sophia-Antipolis Cedex; France, No. V7.5.0, Sep. 1, 2007; pp. 1-216, SP050362316.

*Primary Examiner* — Mehmood B Khan
(74) *Attorney, Agent, or Firm* — Blakely Sokoloff Taylor & Zafman, LLP

(57) ABSTRACT

A cellular network system comprises a device identifier comparator and a connection enable indicator. A device identifier comparator for comparing a received device identifier with one of a plurality of stored device identifiers, wherein the one of the stored plurality of stored device identifiers is associated with a stored subscriber identifier. A connection enable indicator for indicating whether a connection from a cellular device associated with the received device identifier to a data network associated with the cellular network system should be enabled.

16 Claims, 10 Drawing Sheets

Related U.S. Application Data continuation of application No. 12/315,178, filed on Nov. 26, 2008, now Pat. No. 8,175,611.

(60) Provisional application No. 61/004,653, filed on Nov. 29, 2007, provisional application No. 61/004,654, filed on Nov. 29, 2007.

(51) Int. Cl.
*H04B 7/26* (2006.01)
*H04L 29/06* (2006.01)

(56) References Cited

U.S. PATENT DOCUMENTS

| | | | |
|---|---|---|---|
| 6,865,680 B1* | 3/2005 | Wu et al. | 726/12 |
| 7,768,941 B1* | 8/2010 | Brown et al. | 370/252 |
| 7,774,821 B2* | 8/2010 | Dunn et al. | 725/151 |
| 7,962,126 B2* | 6/2011 | Haung et al. | 455/412.2 |
| 8,122,136 B2* | 2/2012 | Bernier et al. | 709/229 |
| 8,335,880 B2 | 12/2012 | Knowles et al. | |
| 2002/0095588 A1* | 7/2002 | Shigematsu et al. | 713/186 |
| 2003/0050070 A1* | 3/2003 | Mashinsky et al. | 455/452 |
| 2004/0268122 A1* | 12/2004 | Satarasinghe et al. | 713/159 |
| 2005/0114680 A1 | 5/2005 | Chinnaswamy et al. | |
| 2006/0064588 A1* | 3/2006 | Tidwell et al. | 713/169 |
| 2006/0128362 A1* | 6/2006 | Bae et al. | 455/411 |
| 2006/0223497 A1* | 10/2006 | Gallagher et al. | 455/410 |
| 2006/0223498 A1* | 10/2006 | Gallagher et al. | 455/410 |
| 2007/0061864 A1 | 3/2007 | Bali et al. | |
| 2007/0226322 A1* | 9/2007 | Yamazaki et al. | 709/219 |
| 2007/0268888 A1* | 11/2007 | Shatzkamer et al. | 370/352 |
| 2008/0167036 A1* | 7/2008 | Bush et al. | 455/435.1 |
| 2008/0268888 A1 | 10/2008 | Chen et al. | |
| 2009/0036096 A1* | 2/2009 | Ibrahim | 455/411 |
| 2009/0100514 A1* | 4/2009 | Jin et al. | 726/15 |
| 2009/0280789 A1* | 11/2009 | Takuno et al. | 455/418 |

* cited by examiner

| ID Copy Rule | ID Mismatch Action Rule | ID Compare | Action Applied on Mismatch | | ID Copy |
| --- | --- | --- | --- | --- | --- |
| | | | Deny? | Alert? | |
| None | Deny | N | N | N | N |
| None | Allow | N | N | N | N |
| None | Deny and Alert | N | N | N | N |
| None | Allow and Alert | N | N | N | N |
| Copy Always | Deny | Y | N | N | Y |
| Copy Always | Allow | Y | N | N | Y |
| Copy Always | Deny and Alert | Y | N | Y | Y |
| Copy Always | Allow and Alert | Y | N | Y | Y |
| Copy Once | Deny | N | N | N | Y |
| Copy Once | Allow | N | N | N | Y |
| Copy Once | Deny and Alert | N | N | N | Y |
| Copy Once | Allow and Alert | N | N | N | Y |
| Locked | Deny | Y | Y | N | N |
| Locked | Allow | Y | N | N | N |
| Locked | Deny and Alert | Y | Y | Y | N |
| Locked | Allow and Alert | Y | N | Y | N |

FIG. 5

ENHANCED MANAGEABILITY IN WIRELESS DATA COMMUNICATION SYSTEMS

CROSS REFERENCE TO OTHER APPLICATIONS

This application claims priority to U.S. patent application Ser. No. 13/437,775 entitled ENHANCED MANAGEABILITY IN WIRELESS DATA COMMUNICATIONS SYSTEMS filed on Apr. 2, 2012, which is a continuation of U.S. patent application Ser. No. 12/315,178 entitled ENHANCED MANAGEABILITY IN WIRELESS DATA COMMUNICATIONS SYSTEMS filed Nov. 26, 2008 and issued May 8, 2012 as U.S. Pat. No. 8,175,611, which claims the benefit of U.S. Provisional Patent Application No. 61/004,653 entitled ENHANCED MANAGEABILITY IN WIRELESS DATA COMMUNICATION SYSTEMS filed Nov. 29, 2007; claims priority to U.S. Provisional Patent Application No. 61/004,654 entitled ENHANCED PROVISIONING LOGISTICS AUTOMATION FOR WIRELESS DATA COMMUNICATION SYSTEMS filed Nov. 29, 2007, which is incorporated herein by reference for all purposes.

BACKGROUND OF THE INVENTION

In some applications of cellular communication services, a service provider negotiates an advantageous billing rate per volume of data transfer between a device and a cellular communications network based on the specific needs of the service the service provider is providing to its customers. For example, a customer requires regular transmissions of very small amounts of data and negotiates an advantageous rate based on a guarantee of a small total data transfer volume. The service provider and the cellular communication network have an interest in ensuring that the customer is not able to use the cellular communication service outside of the negotiated parameters.

BRIEF DESCRIPTION OF THE DRAWINGS

Various embodiments of the invention are disclosed in the following detailed description and the accompanying drawings.

FIG. 5 illustrates an embodiment of a rule behavior table.

DETAILED DESCRIPTION

Figure 1:
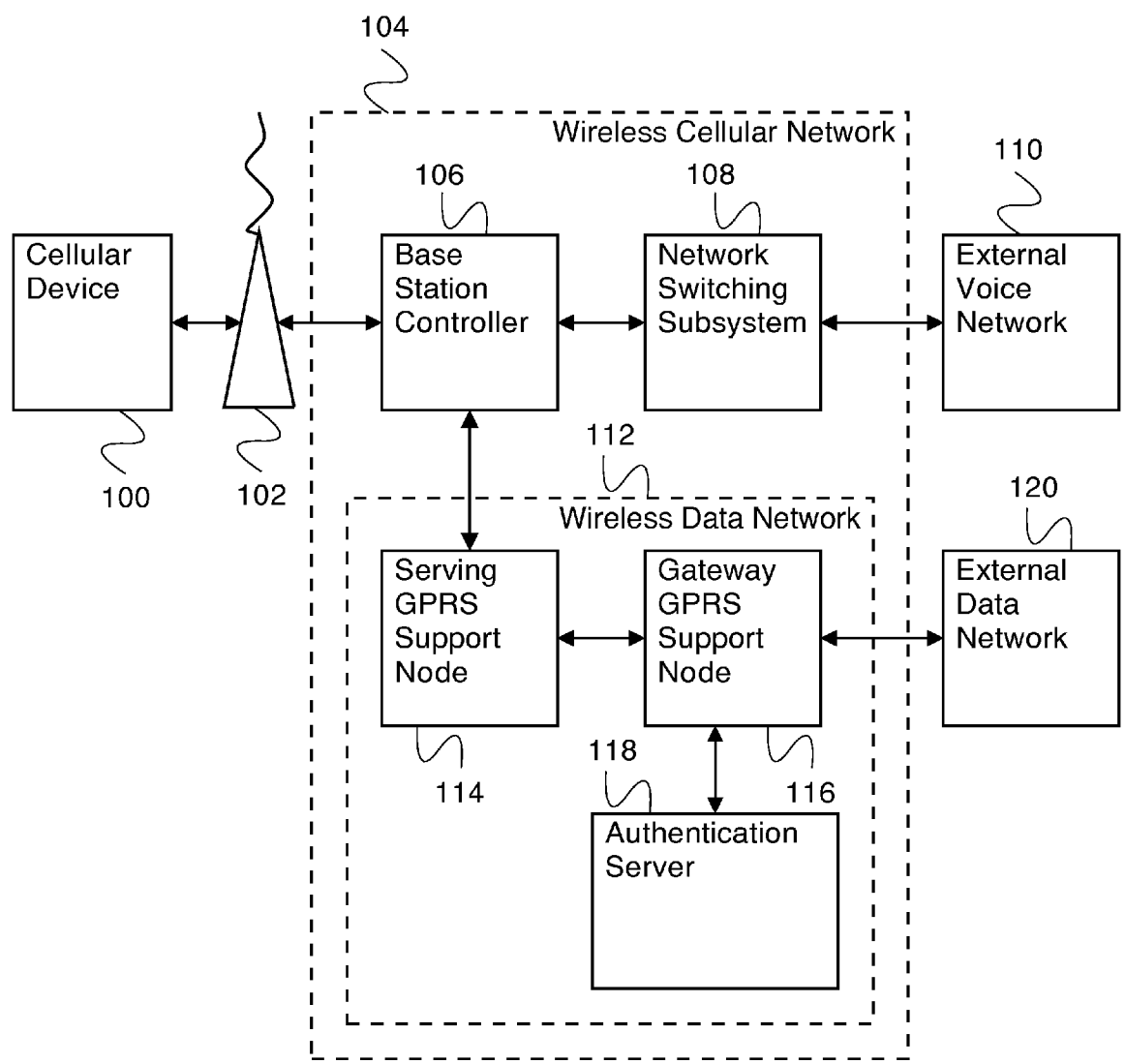
FIG. 1 is a block diagram illustrating an embodiment of a wireless cellular network with data network overlay.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Enhanced manageability in wireless data communication systems is disclosed. A system implementing enhanced manageability comprises a rule-based authentication server for verifying that a particular combination of subscriber identity module (SIM) and device are allowed to use a network (e.g., a data network of a cellular phone network). Identification information associated with the SIM and the device are communicated with the network. The network in conjunction with a service provider determines acceptable accessibility between the device (e.g., a device provided by the service provider) and the network.

In some embodiments, the network comprises a global system for mobile communications (GSM) protocol network. The GSM network includes a username and a password for verification when a device registers with a general packet radio service (GPRS) data network overlaid on the GSM cellular network. The username fields and the password fields are used to provide device and SIM identification information to the network. In some networks, the username and password verification are not used, and either no data or meaningless data is/are transmitted. The network and/or service provider (e.g., an authentication server and/or a service provider server) determines the appropriate action based on the identification numbers and a set of rules. In various embodiments, the appropriate action includes one or more of the following: allowing access, denying access, alerting a customer of a change in a device being used with a given SIM, logging the current device/SIM combination, or any other appropriate server action.

In various embodiments, the relationship between a customer and a cellular communications service provider is direct or is arranged by a third party (e.g., a service provider). In some embodiments, a guarantee of data transfer volume is based on the requirements of a device (e.g., a service provider provided device) specific to the customer's desired application (e.g., a point of sale device, a credit card reader, a credit card approval device). To prevent an account being used with a device requiring higher data transfer which is outside of a desired network usage parameters (e.g., data transfer volume, usage access times, number of accesses, etc.), one or more conditions are enforced on a device used in conjunction with the account (e.g., as coupled to a user or customer via a SIM). In various embodiments, the one or more conditions comprise a prevention of a swapping of a SIM from a device to another device, a limitation on devices or kinds of devices to which the SIM can be swapped, a tracking of devices the SIM has been swapped to, or any other appropriate condition.

In various embodiments, device information is encoded into a username field, user/account/subscriber/customer information is encoded into a username field, device information is encoded into a password field, user/account/subscriber/customer information is encoded into a password field, device information is encoded into a username field and a password field, user/account/subscriber/customer information is encoded into a username field and a password field, device information is partially encoded into a username field and/or a password field, user or account or subscriber or customer information is partially encoded into a username field and/or a password field, any other appropriate allocation of information between device, user, account, subscriber, customer or other information and a username field and/or a password field. In some embodiments, the encoding comprises a secure encoding, a tamper proof encoding, no encoding, an error checking encoding, or any other appropriate encoding. In various embodiments, a username field and/or a password field is subdivided to provide storage space for one or more of the following: a production date, a sign up date, an expiration date, a maintenance date, an account type, a rule set version, an encoding version, service provider identifier, a home network identifier, a revision number, or any other appropriate information.

In some embodiments, a username and password are not set up in advanced. In some embodiments, the username and/or password are established on first or subsequent login attempts. In some embodiments, a customer or a device indicates a different username and/or password on a login attempt based at least in part on the device identifier associated with the device that a user or customer is using to connect to a network.

In some embodiments, the username and/or password fields are or are not used for authentication. In some embodiments, the username and/or password fields are used for passing other information (e.g., device identity) enabling management of a user and/or customer account regarding allowed device(s) for a given user's and/or customer's interaction with a network.

Although the following description focuses on a GSM type cellular network, this should not be construed as limiting as other embodiments using other cellular network types (e.g., CDMA, TDMA, etc.) are implementable to one practiced in the art.

FIG. 1 is a block diagram illustrating an embodiment of a wireless cellular network with data network overlay. In the example shown, cellular device 100 comprises a communications device that uses wireless cellular network 104 and wireless data network 112. In some embodiments, wireless cellular network 104 comprises a global system for mobile communications (GSM) network and wireless data network 112 comprises a general packet radio service (GPRS) network. In some embodiments, cellular network 104 and data network 112 comprise a cellular network and a data network other than a GSM network and a GPRS network. In various embodiments, cellular device 100 comprises a cellular telephone, a mobile smart phone with data transfer capability, a mobile data communications device, a network interface for a wireless data processing device, or any other appropriate mobile communications device. Wireless cellular network 104 allows a user of cellular device 100 to engage in voice communications with devices accessed through voice network 110 and data communications with devices accessed through data network 120. Cellular device 100 communicates with wireless cellular network 104 via cellular base station 102. Base station 102 contains a radio transmitter and receiver for communicating with cellular devices (e.g., cellular device 100) and a communications system for communicating with base station controller 106. Base station controller 106 controls base station 102 and enables communication with voice network 110 via network switching subsystem 108 and with data network 120 via wireless data network 112. In various embodiments, base station controller controls one base station, two base stations, ten base stations, or any other appropriate number of base stations. Network switching subsystem 108 controls voice network switching, maintains a register of cellular device locations, and connects the GSM network with voice network 110. Voice network 110 is a voice telephony network for connecting various voice telephony devices. In various embodiments, voice telephony network 110 comprises a public switched telephone network, a private voice telephony network, or any other appropriate voice telephony network. By enabling cellular device 100 to connect to voice network 110, a user of cellular device 100 is able to have a verbal conversation with another user of a device that is directly or indirectly connected to voice network 110 (e.g., a cell phone user, a wired telephone user, a internet telephone user—for example, a voice over internet protocol user). For example, a user can use cellular device 100 to make a telephone call to someone. Wireless data network 112 controls data communications switching and connects cellular network 104 with data network 120. Data network 120 comprises a data communications network for connection various data communications devices. Data network 120 comprises one or more of the following: a local area network, a wide area network, a wired network, a wireless network, the Internet, a fiber network, a storage area network, or any other appropriate network enabling communication. By enabling cellular device 100 to connect to data network 120, a user of cellular device 100 or cellular device 100 itself can interact with other devices or servers or applications running on other devices or servers via data network 120. For example, cellular device 100 can contact a server to inquire about a transaction (e.g., a credit card authorization for a purchase).

Wireless data network 112 comprises serving GPRS support node (SGSN) 114, gateway GPRS support node (GGSN) 116, and authentication server 118. SGSN 114 sends data packets to and receives data packets from a cellular device (e.g., cellular device 100) and communicates data with GGSN 116. GGSN 116 serves as an interface between wireless data network 112 and external data network 120. GGSN 116 communicates with SGSN 114 and with the external data network, and translates the data packets into the appropriate formats for the devices on each side. In some embodiments, there is more than one GGSN in a given wireless data network, each GGSN connecting to the same SGSN. In some embodiments, each GGSN connects to the same external data network. In some embodiments, a plurality of GGSNs connect to one or more different data networks. GGSN 116 also connects to authentication server 118. In some embodiments, GGSN 116 uses authentication server 118 to authenticate a user of the wireless network before allowing the user to connect to data network 120.

In some embodiments, authentication server 118 receives authentication information including several fields, including a SIM identification field, a username field and a password field. The username field and the password field convey information regarding a device identifier and a user or subscriber or customer, or account identifier. In some embodiments, authentication server 118 uses the device identifier and user/subscriber/customer/account information to evaluate whether an interaction of the device and user/subscriber/customer/account satisfies one or more conditions. In various embodiments, the one or more conditions comprise an acceptable pairing or an unacceptable pairing of the device and the user/subscriber/customer/account, or any other appropriate condition. In various embodiments, condition leads to whether the pairing is allowed, is denied, is logged, causes an alert to be sent, or any other appropriate action led to as a result of the condition.

Figure 2:
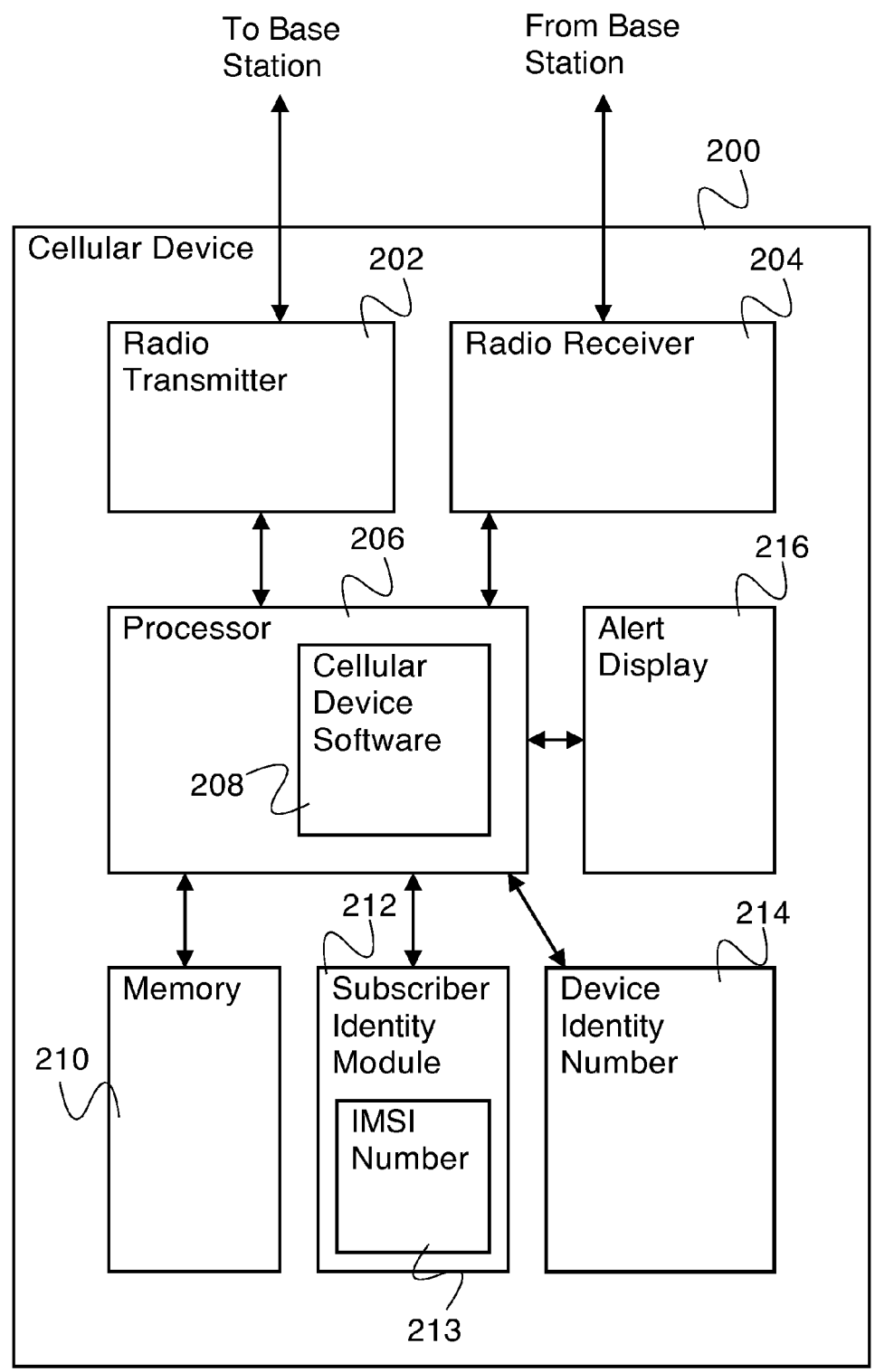
FIG. 2 is a block diagram illustrating an embodiment of a cellular device.

FIG. 2 is a block diagram illustrating an embodiment of a cellular device. In some embodiments, cellular device 200 comprises cellular device 100 of FIG. 1. In the example shown, cellular device 200 comprises radio transmitter 202, radio receiver 204, processor 206, memory 210, subscriber identity module 212, device identity number 214, and alert display 216. Radio transmitter 202 and radio receiver 204 communicate with a base station (e.g., base station 102 of FIG. 1) using wireless radio communication. For example, radio transmitter 202 and radio receiver 204 communicate according to the GSM standard. In various embodiments, radio transmitter 202 and/or radio receiver 204 communicate using frequency modulated signals, phase modulated signals, amplitude modulated signals, time division multiplexing signals, code division multiplexing signals, or signals encoded using any other appropriate communication scheme or protocol. In various embodiments, radio transmitter 202 and/or radio receiver 204 communicate in the medium frequency band, the high frequency band, the very high frequency band, the ultra high frequency band, or any other appropriate frequency band. In various embodiments, radio transmitter 202 and/or radio receiver 204 communicate voice signals, data signals, text signals (e.g., short message service (SMS)), configuration and/or registration signals, or any other appropriate kinds of signals. Radio transmitter 202 and radio receiver 204 receive instructions and communicate data with the rest of cellular device 200 via processor 206. Processor 206 controls cellular device 200. Processor 206 communicates with radio transmitter 202 and radio receiver 204, as well as with memory 210, subscriber identity module 212, and device identity number 214. Processor 206 executes a set of instructions to control the device—for example, instructions in the form of software or code (e.g., designated as cellular device software 208 in FIG. 2). In some embodiments, cellular device software 208 is stored in semiconductor memory (e.g., random access memory, read only memory, programmable read only memory, memory 210, or any other appropriate storage for storing software for processing by a processor). Memory 210 acts as temporary and/or long-term information storage for processor 206 as it is controlling cellular device 200. Subscriber identity module (SIM) 212 comprises a removable module for an identity number that cellular device 200 uses to identify the user of cellular device 200 to the network. SIM 212 stores international subscriber identity module (IMSI) number 213. Device identity number 214 comprises an identity number uniquely identifying cellular device 200. In some embodiments, cellular device 200 does not store device identity number 214. In various embodiments, alerts are not sent to cellular device 200, alerts are sent to cellular device 200, alerts are sent to a Customer's Corporate Email, a Customer accesses the Alerts via web portal and/or an API, or any other appropriate alerting manner or mechanism.

Figure 3:
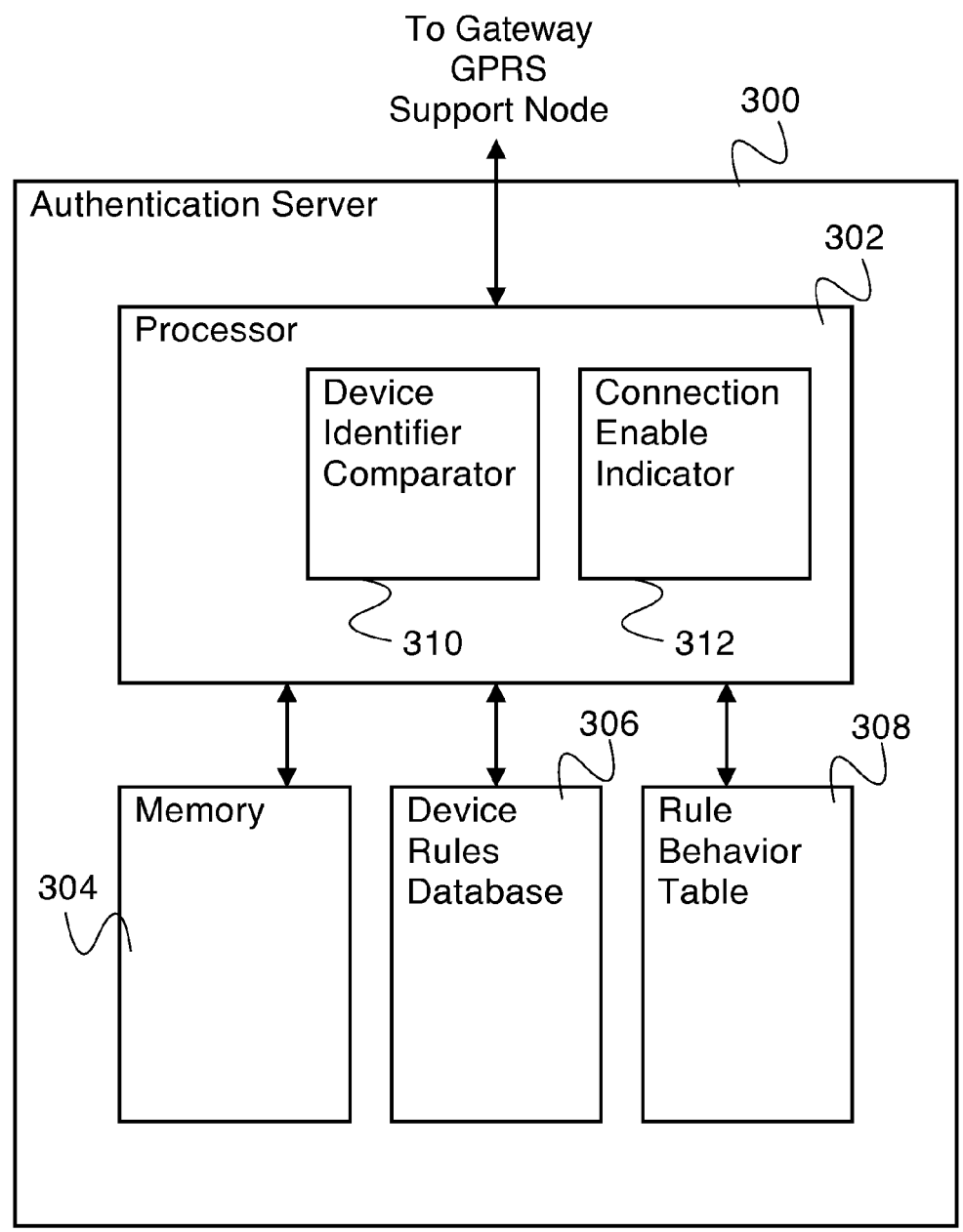
FIG. 3 is a block diagram illustrating an embodiment of an authentication server.

FIG. 3 is a block diagram illustrating an embodiment of an authentication server. In some embodiments, authentication server 300 of FIG. 3 comprises authentication server 118 of FIG. 1. In the example shown, authentication server 300 comprises processor 302, memory 304, device rules database 306, and rule behavior table 308. Processor 302 communicates with a GGSN (e.g., GGSN 116 of FIG. 1) to specify whether a cellular device (e.g., cellular device 100 of FIG. 1) should be allowed to use a data network (e.g., data network 120 of FIG. 1). In various embodiments, the user or account associated with the cellular device is identified by one or more of: an IMSI number (e.g., IMSI number 213 of FIG. 2), by a device identity number (e.g., device identity number 214 of FIG. 1), by an identification code stored on the cellular device, by an identification code entered manually by the cellular device user, or by any other appropriate identification method. In the example shown, the cellular device user is identified with an IMSI number and a device identity number. Processor 302 communicates with device rules database 306 to identify the device identity number and authentication rules associated with a given IMSI number. Processor 302 communicates with rule behavior table 308 to determine the authentication behaviors corresponding to a given set of authentication rules found in device rules database 306. Memory 304 acts as temporary and/or long-term information storage for processor 302 as it is controlling cellular device 300.

Processor 302 comprises device identifier comparator 310 and connection enable indicator 312. Device identifier comparator 310 compares a received device identifier (e.g., a number, an alphanumeric code, or any other appropriate identifier) with a stored device identifier. In some embodiments, a device identifier is associated with a user/account/customer. In some embodiments, the received device identity number is received from a GGSN. In some embodiments, the received device identity number is received along with an IMSI number. In some embodiments, the stored device identity number is retrieved from device rules database 306. Connection enable indicator 312 indicates to the GGSN whether a connection from a cellular device to a data network should be enabled.

In various embodiments, the device identifier comparator determines one of the following: that the received device identifier is the same as the one of the plurality of stored device identifiers or that the received device identifier is not the same as the one of the plurality of stored device identifiers. In some embodiments, the connection enable indicator indicates the connection should be enabled based at least in part on the determination of the device identifier comparator. In some embodiments, the connection enable indicator indicates the connection should be enabled based at least in part on a set of rules. In various embodiments, the set of rules indicates one or more of the following: whether a received device identifier is to be stored, whether a received device identifier is not to be stored, whether a storing of a received device identifier is to be logged, whether a storing of a received device identifier is not to be logged, whether the connection is to be allowed, whether the connection is to be denied, whether the allowance of the connection is to be logged, whether the denial of the connection is to be logged, whether a received device identifier is whether an alert is to be sent, whether an alert is to be logged, or any other appropriate rule.

In some embodiments, a device identifier comprises a numeric identifier, an alphanumeric identifier, a binary identifier, or any other appropriate identifier.

Figure 4:
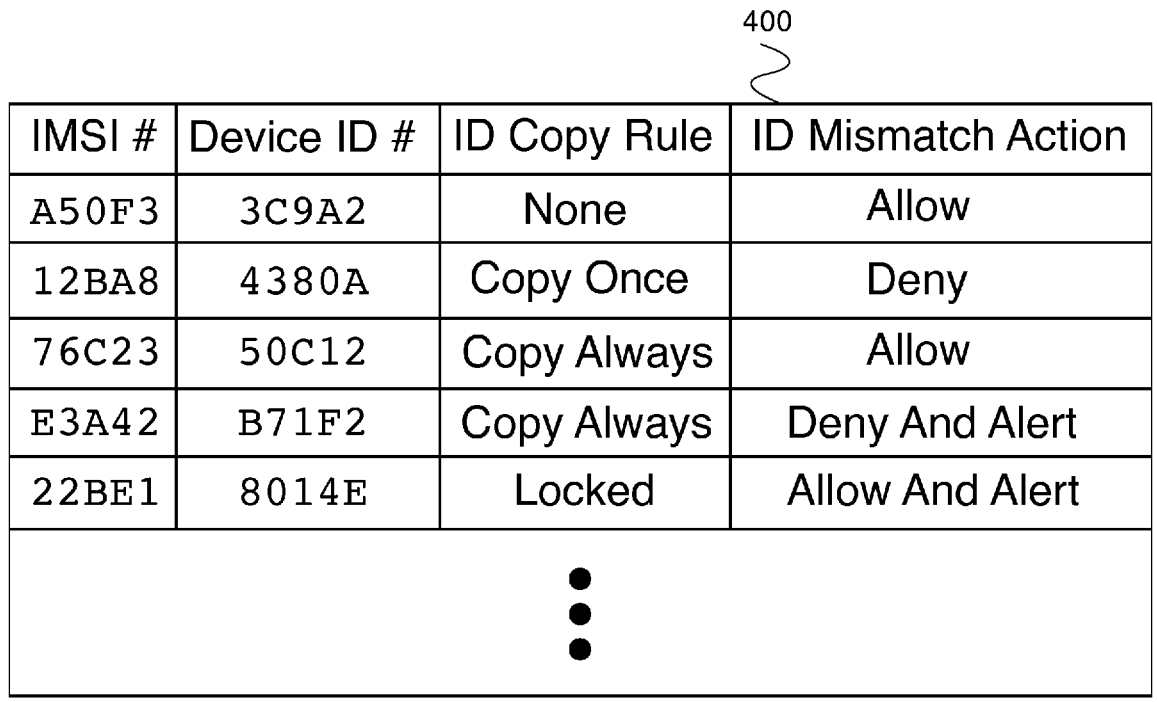
FIG. 4 illustrates an embodiment of a device rules database.

FIG. 4 illustrates an embodiment of a device rules database. In some embodiments, device rules database comprises device rules database 306 of FIG. 3. In the example shown, device rules database 400 comprises a list of cellular device user accounts identified by IMSI number (e.g., IMSI number 213 of FIG. 2), along with information used to determine whether a cellular device (e.g., cellular device 100 of FIG. 1) associated with the account should be allowed to use the data network (e.g., data network 120 of FIG. 1). In some embodiments, IMSI numbers are stored on removable modules (e.g., SIM 212 of FIG. 2) and are able to be moved between cellular devices. Device rules database 400 stores a device identity number (e.g., device identity number 214 of FIG. 2) associated with each IMSI number, such that the processor (e.g., processor 302 of FIG. 3) is able to determine if the device associated with the IMSI number has changed. Device rules database 400 stores an ID copy rule associated with each IMSI number. The ID copy rule specifies whether the device identifier comparator (e.g., device identifier comparator 310 of FIG. 3) should check if the device ID matches the stored device ID, and whether the database should copy the device ID to the database if it does not match. In the example shown, an ID copy rule of 'None' indicates the device identifier comparator should not check whether the device ID stored in the database matches the device ID received from the GGSN. An ID copy rule of 'Copy Always' indicates that the device identifier comparator should compare the received device ID with the stored device ID and copy the received device ID into the device rules database whenever the stored device ID does not match the received device ID. An ID copy rule of 'Locked' indicates that the device identifier comparator should compare the received device ID with the stored device ID, but never copy the received device ID into the device rules database. An ID copy rule of 'Copy Once' indicates that the device identifier comparator should compare the received device ID with the stored device ID and copy the received device ID into the device rules database the first time the received device ID is found to differ from the stored device ID. After the first time the processor copies a received device ID into the database, it changes the ID copy rule from 'Copy Once' to 'Locked', so the stored device ID is not changed again. If the device identifier comparator compares the received device ID with the stored device ID and finds that they match, the connection enable indicator (e.g., connection enable indicator 312) commands the GGSN to allow the cellular device to connect to the data network.

Device rules database 400 also stores an ID mismatch action associated with each IMSI number. The ID mismatch action specifies the authentication action for the processor to take if the stored device ID does not match the received. If the ID copy rule associated with the IMSI number is 'None', the processor takes the authentication action associated with the stored ID mismatch action without comparing the stored device ID and the received device ID. An ID mismatch action of 'Allow' indicates that the connection enable indicator should command the GGSN to allow the cellular device to connect to the data network. An ID mismatch action of 'Allow And Alert' indicates that the connection enable indicator should command the GGSN to allow the cellular device to connect to the data network and also set an alert flag indicating that there was an ID mismatch. The alert flag is displayed on an alert display (e.g., alert display 216 of FIG. 2) when set.

An ID mismatch action of 'Deny' indicates that the connection enable indicator should command the GGSN not to allow the cellular device to connect to the data network. An ID mismatch action of 'Deny And Alert' indicates that the connection enable indicator should command the GGSN not to allow the cellular device to connect to the data network and also set an alert flag indicating that there was an ID mismatch. The alert flag is displayed on an alert display (e.g., alert display 216 of FIG. 2) when set.

In various embodiments, the device ID, ID copy rule, and ID mismatch action associated with an IMSI number are set by a system administrator, set to a default value, set directly by the customer, or set by any other appropriate method. In the example shown, values in device rules database 400 are initialized to default values and can be modified by a customer service representative when instructed to do so by a customer. The device ID stored in device rules database is also updated whenever appropriate based on the ID copy rule.

FIG. 5 illustrates an embodiment of a rule behavior table. In some embodiments, rule behavior table 500 comprises rule behavior table 308 of FIG. 3. In the example shown, rule behavior table comprises a list of all possible combinations of ID copy rules and ID mismatch actions, and a set of behaviors appropriate for each combination. For each combination, the table specifies whether the processor (e.g., processor 302 of FIG. 3) should compare the received device ID with the stored device ID, what action is applied on mismatch for approving/denying a connection and sending/not sending an alert, and whether the processor should copy the received device ID to the device rules database (e.g., device rules database 400 of FIG. 4) in the event the received device ID does not match the stored device ID.

In the example shown, the device identifier comparator compares the stored device ID with the received device ID for 'Copy Always' and 'Locked' ID copy rule conditions. The device identifier comparator does not compare the stored device ID with the received device ID for 'None' and 'Copy Once' ID copy rule conditions. If the stored device ID matches the received device ID, the connection enable indicator commands the GGSN to allow the cellular device to connect to the data network. In the event that the ID copy rule condition is 'None', 'Copy Always', or 'Copy Once', the action applied on mismatch is that a connection is not denied (e.g., allowed). In the event that the ID copy rule condition is 'Locked', the action applied on mismatch is that a connection is denied (e.g., not allowed) for ID mismatch action rule condition of 'Deny' and 'Deny and Alert.' In the event that the ID copy rule condition is 'Locked', the action applied on mismatch is that a connection is not denier (e.g., allowed) for ID mismatch action rule condition of 'Allow' and 'Allow and Alert.' If a connection is not denied, the connection enable indicator commands the GGSN to allow (e.g., enable the connection) the cellular device to connect to the data network If a connection is denied, the connection enable indicator commands the GGSN not to allow (e.g., deny the connection) the cellular device to connect to the data network. The processor sets the alert flag if the IDs do not match and the ID Mismatch Action is set to 'Allow and Alert' or 'Deny and Alert' and the ID copy rule condition is 'Copy Always' and 'Locked'. The processor copies the received device ID to the device rules database if the IDs do not match and the ID Copy Rule is set to 'Copy Always' or 'Copy Once'.

The process logs the received Device ID's, denial, and/or alert. In some embodiments, there are conditions in which there is no logging of the Device ID's, denial, and/or alert.

Figure 6:
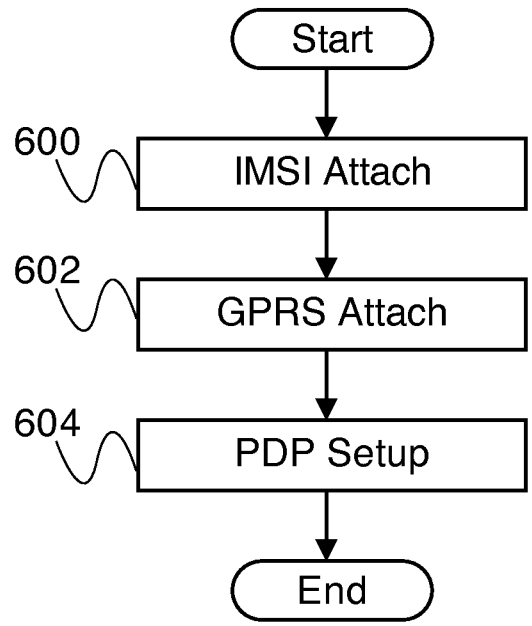
FIG. 6 is a flow diagram illustrating an embodiment of a wireless voice and data registration process.

FIG. 6 is a flow diagram illustrating an embodiment of a wireless data registration process. In some embodiments, the process of FIG. 5 is performed by a cellular device (e.g., cellular device 100 of FIG. 1) when joining a wireless voice and data network (e.g., the wireless voice and data network of FIG. 1). In the example shown, in 600, a cellular device performs an IMSI attach procedure. In some embodiments, the IMSI attach procedure comprises transmitting the device IMSI number (e.g., the IMSI number 213 of FIG. 2) via a wireless network to a network switching subsystem (e.g., network switching subsystem 108 of FIG. 1). In 602, the cellular device performs a GPRS attach procedure. In some embodiments, a GPRS attach procedure comprises transmitting a GPRS attach request via a wireless network to a SGSN (e.g., SGSN 114 of FIG. 1. In 604, the cellular device performs a packet data protocol (PDP) setup procedure. In some embodiments, the PDP setup procedure comprises transmitting a PDP setup request along with a desired network to a SGSN. The SGSN transmits a request to the appropriate GGSN (e.g., GGSN 116 of FIG. 1) to set up a PDP session on its data network.

In some embodiments, the PDP setup procedure comprises transmitting a username and password from the cellular device to the GGSN. In various embodiments, the username and password are manually entered by the user, are stored in the cellular device, contain blank data, contain data that are the same for every user on the network, contain data identifying the IMSI number (e.g., IMSI number 213 of FIG. 2) and the device ID (e.g., device ID 214 of FIG. 2) of the cellular device, or contain any other appropriate data. In the example shown, the username and/or password contain data identifying the IMSI number and the device ID of the cellular device. In various embodiments, the IMSI number is transmitted in the username field and the device ID is transmitted in the password field, the device ID is transmitted in the username field and the IMSI number is transmitted in the password field, both the IMSI number and the device ID are transmitted in the username field, both the IMSI number and the device ID are transmitted in the password field, the IMSI number and the device ID are transmitted in both the username field and the password field, the IMSI number or other identifier or other information and/or the device ID are encoded, securely encoded, error check coded, the IMSI number and the device ID are transmitted in a portion of the username field and/or the password field, or the device ID and the IMSI number are transmitted in the username and password field in any other appropriate way. When the GGSN has verified that the cellular device should be allowed to connect to the data network, the GGSN then sets up a session and creates a connection through the SGSN from the cellular device to the newly set up session on the data network.

Figure 7:
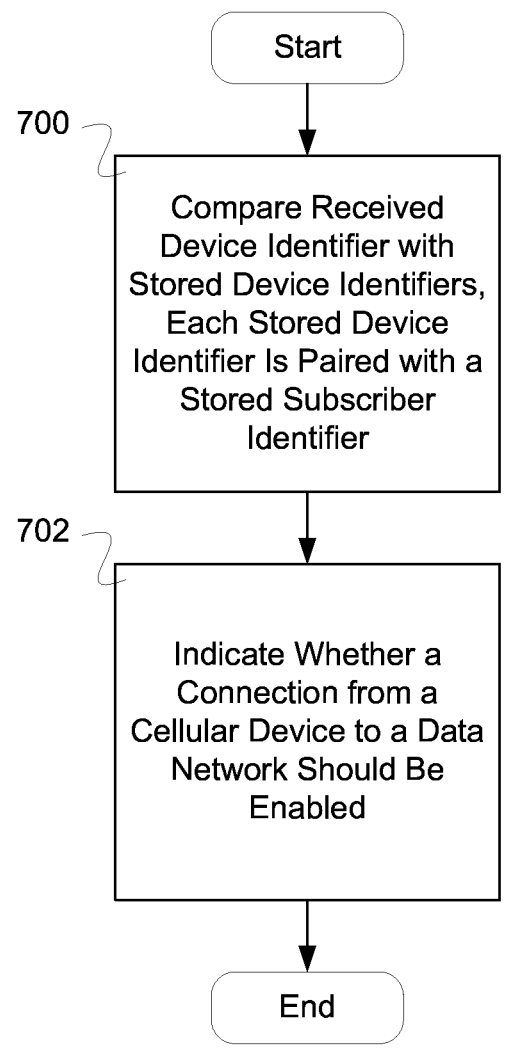
FIG. 7 is a flow diagram illustrating an embodiment of a process for authenticating a cellular device to use a wireless data network.

FIG. 7 is a flow diagram illustrating an embodiment of a process for authenticating a cellular device to use a wireless data network. In some embodiments, the process of FIG. 7 is executed by processor 302 of FIG. 3 during a PDP setup procedure (e.g., PDP setup procedure 604 of FIG. 6). In the example shown, in 700, a received device identifier (e.g., device identity number 214 of FIG. 2) is compared with stored device identifiers (e.g., a plurality of stored device identifiers or device identity numbers stored in device rules database 400 of FIG. 4); each stored device identifier is paired with a stored subscriber identifier (e.g., each of the plurality of stored device identifiers is associated with a stored subscriber identifier—for example, an IMSI number stored in device rules database 400 of FIG. 4). In 702, it is indicated whether a connection from a cellular device (e.g., cellular device 100 of FIG. 1 that is associated with a received device identifier) to a data network (e.g., external data network 120 of FIG. 1 associated with the cellular network system—for example, wireless cellular network 104 of FIG. 1) should be enabled.

Figure 8:
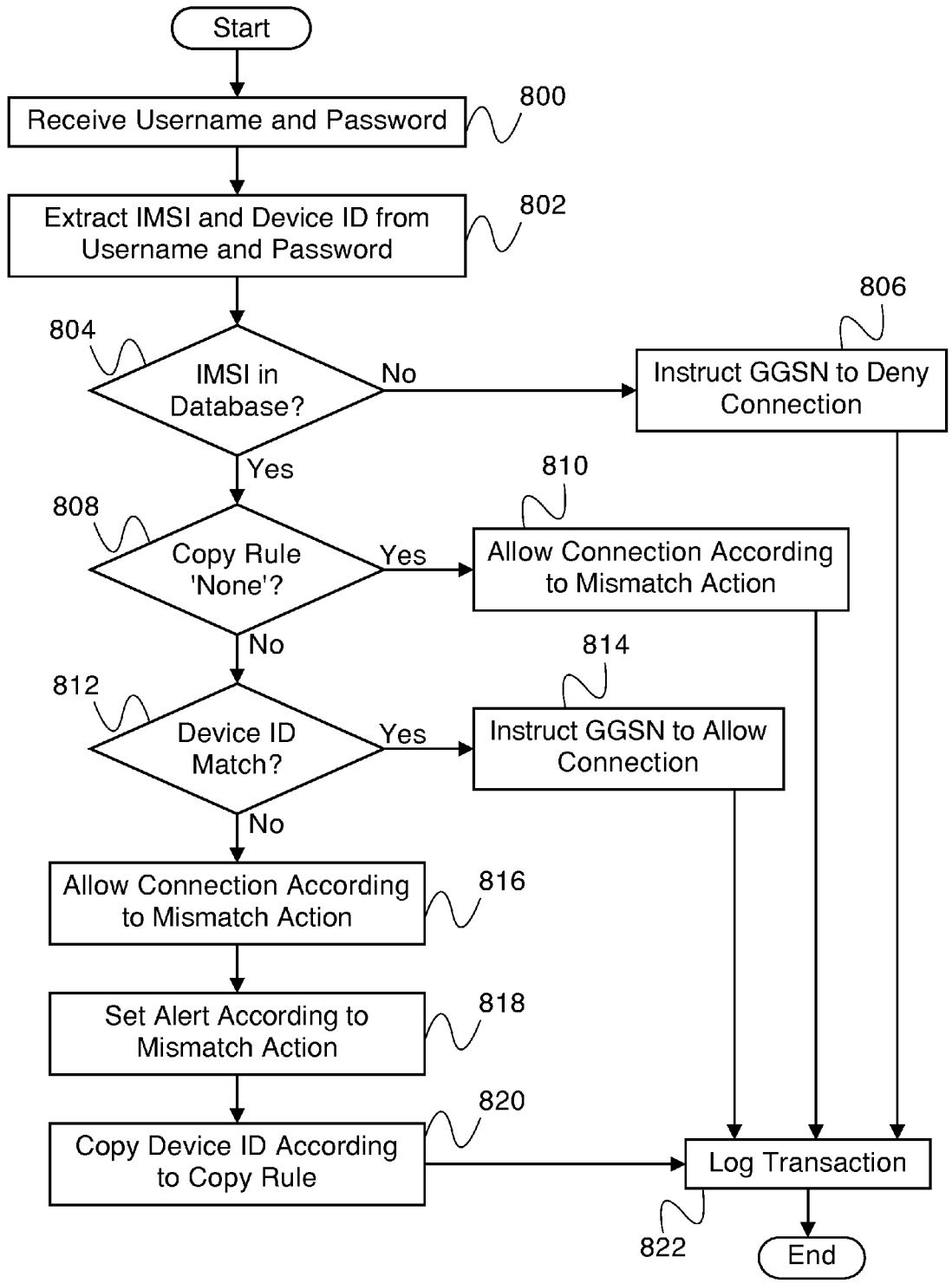
FIG. 8 is a flow diagram illustrating an embodiment of a process for authenticating a cellular device to use a wireless data network.

FIG. 8 is a flow diagram illustrating an embodiment of a process for authenticating a cellular device to use a wireless data network. In some embodiments, the process of FIG. 7 is executed by processor 302 of FIG. 3 during a PDP setup procedure (e.g., PDP setup procedure 604 of FIG. 6). In the example shown, in 800, the username and password are received. The username and password are transmitted by the cellular device (e.g., cellular device 100 of FIG. 1) and comprise a device ID—and an IMSI—identifying the cellular device and associated account. In various embodiments, the device ID and/or IMSI are encoded, securely encoded, error correction coded, or any other appropriate encoding. In various embodiments, a username and/or password is/are determined or encoded at a time of logging into the network by a device based at least in part on a device identifier, or any other appropriate manner of loading a username and/or password. In 802, the IMSI and the device ID are extracted from the username and password. In various embodiments, extraction comprises parsing the username field and/or the password field, decoding the data in all or a portion of the username field and/or the password field, or any other appropriate In 804 the IMSI number is looked up in the database (e.g., device rules database 306 of FIG. 3). If the IMSI is not found in the database, control passes to 806. In 806, the connection enable indicator (e.g., connection enable indicator 312 of FIG. 3) instructs the GGSN (e.g., GGSN 116 of FIG. 1) to deny the connection. Control passes to 822, where the transaction is logged, and the process ends. If the IMSI is found in the database in 804, control passes to 808. In 808, the copy rule associated with the IMSI number is evaluated. If the copy rule is 'None', control passes to 810. In 810, the connection is allowed according to the mismatch action associated with the IMSI number. If the mismatch action is 'Allow' or 'Allow And Alert', the connection enable indicator instructs the GGSN to allow the connection, and if the mismatch action is 'Deny or 'Deny And Alert', the connection enable indicator instructs the GGSN to deny the connection. Control passes to 822, where the transaction is logged, and the process ends. If the copy rule is found not to be 'None' in 808, control passes to 812. In 812, the device identifier comparator (e.g., device identifier comparator 310 of FIG. 3) compares the device ID stored in the database with the received device ID. If the device IDs are found to match, control passes to 814. In 814, the connection enable indicator instructs the GGSN to allow the connection. Control passes to 822, where the transaction is logged, and the process ends.

If the device IDs are not found to match in 812, control passes to 816. In 816, the connection is allowed according to the mismatch action associated with the IMSI number. If the mismatch action is 'Allow' or 'Allow And Alert', the connection enable indicator instructs the GGSN to allow the connection, and if the mismatch action is 'Deny or 'Deny And Alert', the connection enable indicator instructs the GGSN to deny the connection. In 818, the alert is set according to the mismatch action. If the mismatch action is 'Allow And Alert' or 'Deny And Alert', the alert is set. The alert flag is displayed on an alert display (e.g., alert display 216 of FIG. 2) when set. In 820, the device ID is copied to the database according to the copy rule. If the copy rule is 'Copy Always' or 'Copy Once', the received device ID is copied to the database. If the copy rule is 'Copy Once', the copy rule is then set to 'Locked'. Control passes to 822, where the transaction is logged, and the process ends.

Figure 9:
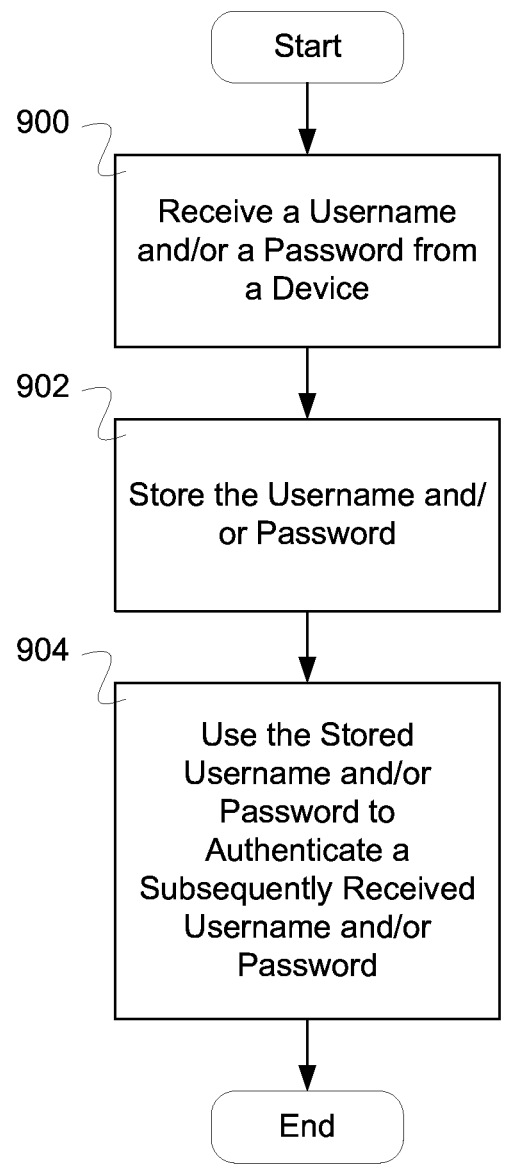
FIG. 9 is a flow diagram illustrating an embodiment for a process for storing a username and/or password.

FIG. 9 is a flow diagram illustrating an embodiment for a process for storing a username and/or password. In the example shown, in 900 a username and/or password is/are received from a device. In some embodiments, the device sends a username and/or password on a first interaction with a network—for example, a registration, subscription initiation, a provisioning, a configuration, or any other appropriate first interaction. In some embodiments, the device sends a username and/or password on request from a user or device manufacturer when a device is swapped, a device is re-subscribed, re-provisioned, reconfigured, or any other appropriate time. In 902, the username and/or password is/are stored. In 904, the stored username and/or password are used to authenticate a subsequently received username and/or password. In some embodiments, the authentication of a subsequently received username and/or password comprises a comparison with the stored username and/or password where the usernames and/or passwords match. Storing a username and/or device as received from a device eliminates the need to coordinate a storage of a username and/or password between a network system and a device that needs to be authenticated by the network in order for the device to use the network for communication (e.g., a voice or a data communication).

In some embodiments, a receiver receives a username and/or password from a device; a data storer stores the username and/or the password; and an authenticator authenticates a subsequently received username and/or password from the device using the stored username or the stored password (e.g., seeing if the stored and subsequently received username and/or the password match). In various embodiments, the username and/or password are received, stored, and/or authenticated by a wireless data network authentication server (e.g., 116 of FIG. 1), by a server attached to an external data network, or any other appropriate server.

Figure 10:
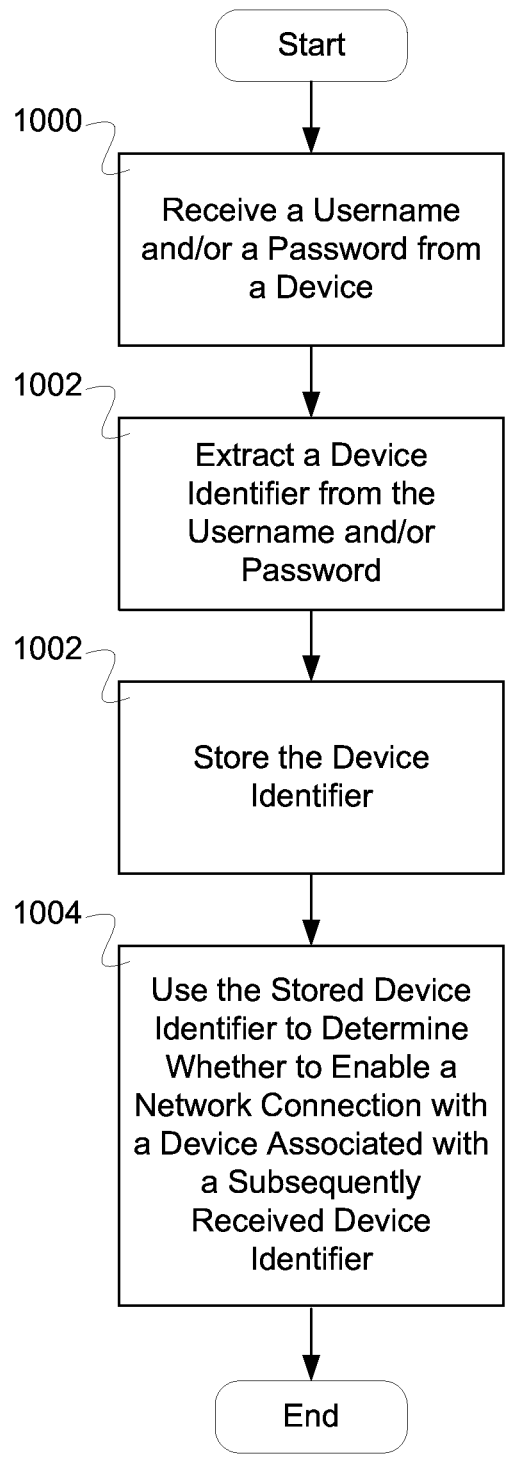
FIG. 10 is a flow diagram illustrating an embodiment for a process for storing a device identifier.

FIG. 10 is a flow diagram illustrating an embodiment for a process for storing a device identifier. In the example shown, in 1000 a username and/or password is/are received from a device. In some embodiments, the device sends a username and/or password on a first interaction with a network—for example, a registration, subscription initiation, a provisioning, a configuration, or any other appropriate first interaction. In some embodiments, the device sends a username and/or password on request from a user or device manufacturer when a device is swapped, a device is re-subscribed, re-provisioned, reconfigured, or any other appropriate time. In 1002, a device ID is extracted from the username and/or password is. In various embodiments, the device ID is stored in the username, the password, the username and the password, a portion of the username, a portion of the password, a first portion of the username and a second portion of the password, or any other appropriate manner in the username and/or password. In some embodiments, the device ID is encoded, encrypted, or obfuscated when stored in the username and/or password. In 1004, the device ID is stored. In 1006, the device ID is used to determine whether to enable a network connection with a device associated with a subsequently received device ID. In various embodiments, the subsequently received device ID is the same as the previously stored device ID and a connection is enabled, not enabled, logged, not logged, and/or an alert sent. In various embodiments, the subsequently received device ID is not the same as the previously stored device ID and a connection is enabled, not enabled, logged, not logged, the subsequently received device ID is stored or not stored, and/or an alert sent. The ability to manage a user account or a subscriber based on the device ID associated with the user account or subscriber enables better control over the traffic conditions that a network experiences for a given account or subscriber.

In some embodiments, a receiver receives a username and/or a password from a device; the receiver receives a subscriber identifier from the device; a mapper maps the received subscriber identifier to a SIM identifier (e.g., the mapper associates the subscriber identifier to a subscriber identity module identifier—for example, one or more of the following: an international mobile subscriber identity, an integrated circuit card identifier, an issuer identification number, an individual account identification, etc.); a data storer for storing the mapping between the device ID and the SIM identifier; and a provider for providing the mapping between the device ID and the SIM identifier. In various embodiments, the username and/or password and/or subscriber identifier are received, mapped, stored, and/or provided by a wireless data network authentication server (e.g., 116 of FIG. 1), by a server attached to an external data network, or any other appropriate server.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A cellular network system comprising:
a data network associated with the cellular network system;
at least one server coupled to the data network, comprising:
a receiver configured for receiving a device identifier and a subscriber identifier from at least one mobile device;
and a processor comprising a connection enable indicator configured for enabling a data network connection and a device identifier comparator configured for comparing the received device identifier to at least one of a plurality of stored device identifiers, each stored device identifier being associated with at least one of a plurality of stored subscriber identifiers,
wherein the connection enable indicator is configured to enable a data network connection between the mobile device and the data network when the device identifier comparator identifies a match between the received device identifier to at least one of the plurality of stored device identifiers, and when no match occurs the processor is configured to replace a stored device identifier corresponding to the received subscriber identifier with the received device identifier according to a condition associated with the received subscriber identifier, wherein each received subscriber identifier is associated with at least one of the plurality of stored subscriber identifiers; and
wherein when no match occurs, the connection enable indicator is configured to enable a data network connection according to the condition associated with the received subscriber identifier and enable at least one of a subscription initiation, a re-subscription, a provisioning, re-provisioning, a configuration, and a re-configuration;
wherein the condition is defined by at least one of a plurality of rules stored in a device rules data base, each rule is associated with at least one of the plurality of stored subscriber identifiers;
wherein the connection enable indicator is configured to enable the data network connection based at least in part on one of the plurality of rules;

wherein at least one of the plurality of rules indicates whether the received device identifier replaces the stored device.

2. A cellular network system as in claim 1, wherein at least one of the plurality of rules indicates whether an alert is to be sent based on the received device identifier.

3. A cellular network system as in claim 1, wherein the received device identifier is based at least in part on information in a username field.

4. A cellular network system as in claim 1, wherein the received device identifier is based at least in part on information in a password field.

5. A cellular network system as in claim 1, wherein at least one of the plurality of rules indicates whether an alert is to be logged based on the received device identifier.

6. A cellular network system as in claim 1, wherein the received subscriber identifier is based at least in part on information in a username field.

7. A cellular network system as in claim 1, wherein the received subscriber identifier is based at least in part on information in a password field.

8. A cellular network system as in claim 1, wherein the received subscriber identifier is encoded.

9. A method for authentication in a cellular network system comprising:
- receiving, in a server coupled to a data network associated with the cellular network system, a device identifier and a subscriber identifier from at least one mobile device;
- comparing the received device identifier to at least one of a plurality of stored device identifiers utilizing a device identifier comparator in a processor of the server, each stored device identifier being associated with at least one of a plurality of stored subscriber identifiers;
- enabling a data network connection, utilizing a connection enable indicator in the processor, between the mobile device and the data network when the device identifier comparator identifies a match between the received device identifier to at least one of the plurality of stored device identifiers;
- replacing, utilizing the processor, a stored device identifier corresponding to the received subscriber identifier with the received device identifier according to a condition associated with the received subscriber identifier when no match occurs, wherein each received subscriber identifier is associated with at least one of the plurality of stored subscriber identifiers; and
- wherein when no match occurs, the connection enable indicator enables a data network connection according to the condition associated with the received subscriber identifier and enables at least one of a subscription initiation, a re-subscription, a provisioning, re-provisioning, a configuration, and a re-configuration;
- wherein the condition is defined by at least one of a plurality of rules stored in a device rules data base, each rule is associated with at least one of the plurality of stored subscriber identifiers; wherein the connection enable indicator enables the data network connection based at least in part on one of the plurality of rules; and wherein at least one of the plurality of rules indicates whether the received device identifier replaces the stored device identifier corresponding to the received subscriber identifier.

10. A method as in claim 9, wherein at least one of the plurality of rules indicates whether an alert is to be sent based on the received device identifier.

11. A method as in claim 9, wherein the received device identifier is based at least in part on information in a username field.

12. A method as in claim 9, wherein the received device identifier is based at least in part on information in a password field.

13. A method as in claim 9, wherein the received device identifier is associated with a received subscriber identifier.

14. A method as in claim 9, wherein the received subscriber identifier is based at least in part on information in a username field.

15. A method as in claim 9, wherein the received subscriber identifier is based at least in part on information in a password field.

16. A method as in claim 9, wherein the received subscriber identifier is encoded.

* * * * *